United States Patent
Weiss et al.

(10) Patent No.: US 7,129,313 B2
(45) Date of Patent: Oct. 31, 2006

(54) PROCESS FOR THE SOLVENT-FREE, CONTINUOUS PREPARATION OF POLYUREAS

(75) Inventors: Joern Volker Weiss, Haltern (DE); Thomas Weihrauch, Duelmen (DE); Werner Grenda, Herne (DE); Silvia Herda, Herne (DE); Klaus Behrendt, Herne (DE)

(73) Assignee: Degussa AG, Duesseldorf (DE)

( * ) Notice: Subject to any disclaimer, the term of this patent is extended or adjusted under 35 U.S.C. 154(b) by 120 days.

(21) Appl. No.: 10/306,215

(22) Filed: Nov. 29, 2002

(65) Prior Publication Data
US 2003/0212238 A1 Nov. 13, 2003

(30) Foreign Application Priority Data
May 10, 2002 (DE) ................................ 102 21 047

(51) Int. Cl.
*C08G 18/32* (2006.01)
*C08G 18/79* (2006.01)
(52) U.S. Cl. .................... 528/68; 528/67; 528/73
(58) Field of Classification Search ................ 528/68, 528/73, 67
See application file for complete search history.

(56) References Cited

U.S. PATENT DOCUMENTS

| | | | | |
|---|---|---|---|---|
| 2,761,852 A | * | 9/1956 | Lehmann et al. | 524/589 |
| 2,852,494 A | * | 9/1958 | Lehmann et al. | 528/57 |
| 3,963,679 A | * | 6/1976 | Ullrich et al. | 528/45 |
| 4,045,510 A | * | 8/1977 | Login | 525/430 |
| 4,442,280 A | * | 4/1984 | Grogler et al. | 528/54 |
| 5,786,439 A | * | 7/1998 | Van Antwerp et al. | 528/77 |
| 5,856,420 A | * | 1/1999 | Tucker et al. | 528/53 |
| 6,007,914 A | * | 12/1999 | Joseph et al. | 428/391 |
| 6,013,755 A | * | 1/2000 | Primeaux et al. | 528/68 |
| 2002/0040763 A1 | * | 4/2002 | Grenda et al. | 156/331.7 |
| 2003/0105220 A1 | * | 6/2003 | Gupta et al. | 524/589 |

FOREIGN PATENT DOCUMENTS

| | | |
|---|---|---|
| DE | 24 23 764 | 11/1975 |
| EP | 1 184 399 | 3/2002 |
| GB | 1 508 317 | 4/1978 |

* cited by examiner

*Primary Examiner*—Rabon Sergent
(74) *Attorney, Agent, or Firm*—Oblon, Spivak, McClelland, Maier & Neustadt, P.C.

(57) ABSTRACT

The invention relates to a process for the solvent-free, continuous preparation of polyureas by reacting at least one isocyanate and/or isocyanurate having at least two NCO groups with at least one diamine and/or polyamine in an extruder, intensive kneader, intensive mixer or static mixer by thorough mixing and rapid reaction by briefly heating and subsequent cooling to isolate the end product.

1 Claim, No Drawings

PROCESS FOR THE SOLVENT-FREE, CONTINUOUS PREPARATION OF POLYUREAS

BACKGROUND OF THE INVENTION

1. Field of the Invention

The invention relates to a process for the solvent-free, continuous preparation of polyureas by reacting at least one diisocyanate and/or isocyanurate with at least one diamine in an extruder, intensive kneader, intensive mixer or static mixer by thorough mixing and brief reaction by heating and subsequent isolation of the end product by cooling.

2. Description of the Related Art

Polyureas are disclosed in EP 1 184 399. They are prepared in solvents, as described therein. A disadvantage of this preparation method is that the batchwise preparation of the desired product polyurea in the solvent toluene is very time-consuming and energy inefficient, since the product has to be dried for several hours at elevated temperatures under reduced pressure. The method described is an extremely inconvenient and expensive one for the industrial production of polyureas.

It is an object of the present invention to provide a novel process for the preparation of polyureas, which does not have the disadvantages of the prior art.

Surprisingly, it was found that polyureas can be prepared rapidly and in an uncomplicated manner in an extruder, intensive kneader, intensive mixer or static mixer.

The present invention relates to a process for the solvent-free, continuous preparation of polyureas by reacting at least one isocyanate and/or isocyanurate having at least two NCO groups with at least one diamine and/or polyamine in an extruder, intensive kneader, intensive mixer or static mixer by thorough mixing and rapid reaction by briefly heating and subsequent isolation of the end product by cooling.

The principle of the process is that the reaction of the reactants is carried out continuously in an extruder, intensive kneader, intensive mixer or static mixer by thorough mixing and rapid reaction by briefly heating.

Temperatures of from 10 to 325° C. are used in the process, the temperature varying, as shown in the examples, depending on the product.

The residence time of the starting materials in the above mentioned units is usually from 3 seconds to 15 minutes, preferably from 3 seconds to 5 minutes, particularly preferably from 5 to 180 seconds. The reactants are rapidly reacted by briefly heating at temperatures of from 25 to 325° C., preferably from 50 to 250° C., very particularly preferably from 70 to 220° C. Depending on the nature of the starting materials and of the final products, these values for residence time and temperature may also have other preferred ranges.

It is possible to discharge continuously the resulting, homogeneous, generally crumbly material. Optionally, a continuous subsequent reaction may be carried out, otherwise the hot product is cooled (e.g. on a cooling belt) and further compounded (e.g. milled), if required.

Extruders, such as single-screw or multiscrew extruders, in particular twin-screw extruders, planetary roller extruders or annular extruders, intensive kneaders, intensive mixers, such as Turrax mixers, or static mixers are particularly suitable as units for the process according to the invention and are preferably used.

It was surprising that the reaction, which requires several hours in the batchwise process, takes place essentially to completion in a few seconds in the units. In addition, the product is obtained in solid, more or less granular form and can, after cooling is complete, be fed for further working-up (e.g. milling) or directly for storage (e.g. silo) or packing (e.g. bagging). The basic principle is the fact that a brief application of heat in conjunction with the mixing effect of the unit (e.g. intensive kneader) is sufficient to convert the reactants completely or substantially completely. By suitable equipping of the mixing chambers or assembly of the screw geometries, intensive kneaders permit rapid thorough mixing with simultaneous intense heat exchange. On the other hand, uniform flow in the longitudinal direction with as uniform a residence time as possible is also ensured. Moreover, different amounts of heat in the individual apparatus housings or sections may be generated.

The reactants are metered into the units as a rule in separate reactant streams. In the case of more than two reactant streams, they may also be combined before being fed in. The material streams may also be divided and fed to the units in different amounts at different points. In this way, specific concentration gradients are established, which results in complete reaction. The entry points and time of entry of the reactant streams in the sequence may be varied.

For preliminary reaction and/or completion of the reaction, a plurality of units may also be combined.

The cooling following the rapid reaction can be integrated in the reaction part, in the form of a multizone embodiment, as in the case of extruders or Conterna machines. It is also possible to use: tube bundles, pipe coils, chillrolls, air conveyors and conveyor belts of metal.

The end product may be compounded by being first brought to a suitable temperature by further cooling by appropriate means above, depending on the viscosity of the end product leaving the intensive kneader zone or the postreaction zone. Pelletizing or comminution of the end product to a desired particle size is then carried out by means of crushing rolls, a pinned disk mill, a hammer mill, an air separation ball mill, a flaking mill or the like.

All known aliphatic, cycloaliphatic, araliphatic and aromatic isocyanates having at least two NCO groups and the isocyanurates thereof in pure form or as mixtures with one another, may be used for the preparation of the polyureas. The following may be mentioned by way of example: cyclohexane diisocyanates, methylcyclohexane diisocyanates, ethylcyclohexane diisocyanates, propylcyclohexane diisocyanates, methyldiethylcyclohexane diisocyanates, phenylene diisocyanates, tolylene diisocyanates, bis(isocyanatophenyl)methane, propane diisocyanates, butane diisocyanates, pentane diisocyanates, hexane diisocyanates (e.g. hexamethylene diisocyanate (HDI) or 1,5-diisocyanato-2-methylpentane (MPDI)), heptane diisocyanates, octane diisocyanates, nonane diisocyanates (e.g. 1,6-diisocyanato-2,4,4-trimethylhexane and 1,6-diisocyanato-2,2,4-trimethylhexane (TMDI)), nonane triisocyanates (e.g. 4-isocyanatomethyl-1,8-octane diisocyanate (TIN)), decane di- and triisocyanates, undecane di- and triisocyanates, dodecane di- and triisocyanates, isophorone diisocyanate (IPDI), bis(isocyanatomethyl-cyclohexyl)methane ($H_{12}$MDI), isocyanatomethyl-methylcyclohexyl isocyanates, 2,5(2,6)bis(isocyanatomethyl)bicyclo[2.2.1]heptane (NBDI), 1,3-bis(isocyanatomethyl)cyclohexane (1,3-$H_6$-XDI) and 1,4-bis(isocyanatomethyl)cyclohexane (1,4-$H_6$-XDI). The list does of course include all regioisomers and stereoisomers of the isocyanates mentioned by way of example. HDI, IPDI, MPDI, TMDI, 1,3- and 1,4-$H_6$-XDI, NBDI and mixtures of HDI and IPDI are preferably used. Preferred polyureas in the context of the invention are those which consist of IPDI, IPDI-isocyanurate, HDI or HDI-isocyanurate and any desired mixtures thereof.

All aliphatic, (cyclo)aliphatic, cycloaliphatic and aromatic diamines and/or polyamines ($C_5$–$C_{18}$) can be used in the invention.

Diamines which are suitable in principle are 1,2-ethylenediamine, 1,2-propylenediamine, 1,3-propylenediamine, 1,2-butylenediamine, 1,3-butylenediamine, 1,4-butylenediamine, 2-(ethylamino)ethylamine, 3-(methylamino)propylamine, 3-(cyclohexylamino)propylamine, 4,4'-diaminodicyclohexylmethane, isophoronediamine, 4,7-dioxadecane-1,10-diamine, N-(2-aminoethyl)-1,2-ethanediamine, N-(3-aminopropyl)-1,3-propanediamine, N,N"-1,2-ethanediylbis(1,3-propanediamine) and hexamethylenediamines, which may also carry one or more $C_1$–$C_4$-alkyl radicals. Mixtures of said diamines can also be used. Isophoronediamine is preferably used.

Polyamines such as, for example, 4-aminomethyl-1,8-octanediamine, diethylenetriamine, dipropylenetriamine, triethylenetetramine and tetraethylenepentamine can also be used.

In general, polyureas having an NCO/$NH_2$ ratio of 0.8 to 1.2:1 are prepared. With the use of equimolar amounts having an NCO/$NH_2$ ratio of 1:1, infinitely crosslinked, solid and brittle polymers which melt only above 240° C. with decomposition and are insoluble in solvents are obtained.

Preferred polyureas in the context of the invention are those which consist of IPD and IPDI and/or IPDI-isocyanurate and/or HDI and/or HDI-isocyanurate. These have molar masses of more than 4000 and contain at least 8% by weight, preferably 20% by weight, particularly preferably from 40 to 100% by weight, of isocyanurates and/or amines having a functionality of >2, preferably isocyanurates, preferably IPDI- and/or HDI-isocyanurate. Polyureas obtained from pure isocyanurates and IPD are also preferred.

The subject of the invention is explained below with reference to examples.

EXAMPLES

1. Preparation of Polyurea by Reacting a Solution of IPDI-Isocyanurate in Isophorone Diisocyanate (IPDI) with Isophoronediamine (IPD)

The polyurea is prepared from a mixture of 40% by weight of IPDI-isocyanurate and 60% by weight of IPDI as isocyanate component and IPD as amine.

The molar ratio of NCO groups to $NH_2$ groups is 3.00:3.20. Both material streams are fed in liquid form into a twin-screw extruder having corotating screws. The extruder has barrels which are separately temperature-controllable (heatable and coolable).

Barrel 1 is operated at room temperature. Two following barrels are heated to 25 to 60° C. and further following barrels are temperature-controlled at 80 to 180° C. The temperature at which the product emerges is from 130 to 180° C.

The isocyanate mixture is metered into barrel 1 at a rate of 8.95 kg/h. The diamine IPD is added to barrel 3 with a throughput of 5.04 kg/h. The extruder speed is from 100 to 250 rpm. The emerging, white, crumbly product is cooled on a cooling belt.

2. Preparation of Polyurea by Reacting HDI-Isocyanurate with Isophoronediamine (IPD)

The molar ratio of NCO groups to $NH_2$ groups is 1.00:1.00. Both material streams are fed in liquid form into a twin-screw extruder having corotating screws. The extruder has barrels which are separately temperature-controlled (heatable and coolable).

Barrel 1 is temperature-controlled at from 60 to 90° C. Barrel 2 is heated to 100 to 190° C. and three following barrels are temperature-controlled at from 200 to 310° C. There follow two barrels, which are operated at from 130 to 310° C. The temperature at which the product emerges is from 170 to 220° C.

The isocyanate mixture is metered into barrel 1 at a rate of 4.07 kg/h. A pressure control valve adjusted to 8 to 10 bar is required. The diamine IPD is added to barrel 3 with a throughput of 1.78 kg/h.

The extruder speed is from 150 to 250 rpm.

The emerging, white, crumbly product is cooled on a cooling belt.

3. Preparation of Polyurea by Reacting IPDI-Isocyanurate with Isophoronediamine (IPD)

The molar ratio of NCO groups to $NH_2$ groups is 3.00:3.40. The extruder has barrels which are separately temperature-controlled (heatable and coolable).

Barrel 1 is temperature-controlled at from 25 to 60° C. Barrel 2 is heated to 70 to 120° C. and the following three barrels are temperature-controlled at from 160 to 190° C. There follow two barrels, which are operated at 110 to 180° C. The temperature at which the product emerges is from 120 to 170° C.

The isocyanurate is metered into barrel 1 in the form of a coarse powder at a rate of 4.04 kg/h. The diamine IPD is added in liquid form to barrel 4 with a throughput of 0.83 kg/h.

The extruder speed is from 75 to 225 rpm. The emerging, white solid is cooled on a cooling belt.

DE 10221047.0, May 10, 2002, is hereby incorporated by reference.

The invention claimed is:

1. A crosslinked, solid polyurea which melts only above 240° C. by decomposition and is insoluble in solvents, obtained by a process comprising forming a reaction product by reacting, in the absence of a solvent, as reactant (A), (1) an isocyanurate of isophorone diisocyanate (IPDI), (2) a mixture of IPDI and IPDI-isocyanurate, (3) an isocyanurate of hexamethylene diisocyanate (HDI), (4) a mixture of HDI and HDI-isocyanurate, or (5) a mixture of IPDI-isocyanurate and HDI-isocyanurate, with, as reactant (B), isophoronediamine (IPD), wherein (A) and (B) are the only reactants, such that the reaction is carried out with a NCO/$NH_2$ ratio of 1:1, in an extruder, intensive kneader, intensive mixer or static mixer, for a residence time of from 3 seconds to 15 minutes and at a reaction temperature of 50 to 250° C., and then cooling said reaction product, whereby said polyurea is formed.

* * * * *